US011693957B1

(12) United States Patent
Qin et al.

(10) Patent No.: US 11,693,957 B1
(45) Date of Patent: Jul. 4, 2023

(54) OPERATION BEHAVIOR MONITORING METHOD AND APPARATUS, ELECTRONIC DEVICE, AND STORAGE MEDIUM

(71) Applicant: INSPUR SUZHOU INTELLIGENT TECHNOLOGY CO., LTD., Jiangsu (CN)

(72) Inventors: Zhaoyang Qin, Jiangsu (CN); Dong Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/928,193

(22) PCT Filed: Feb. 24, 2021

(86) PCT No.: PCT/CN2021/077645
§ 371 (c)(1),
(2) Date: Nov. 28, 2022

(87) PCT Pub. No.: WO2022/001140
PCT Pub. Date: Jan. 6, 2022

(30) Foreign Application Priority Data

Jun. 29, 2020 (CN) .......................... 202010605998.3

(51) Int. Cl.
*G06F 21/55* (2013.01)
(52) U.S. Cl.
CPC .................................. *G06F 21/554* (2013.01)
(58) Field of Classification Search
None
See application file for complete search history.

(56) References Cited

U.S. PATENT DOCUMENTS 9,558,347 B2 * 1/2017 Chari .................. H04L 63/1483
10,257,211 B2 * 4/2019 Balabine ............... G06F 16/951
(Continued)

FOREIGN PATENT DOCUMENTS

| CN | 109597794 A | 4/2019 |
| CN | 109992578 A | 7/2019 |

(Continued)

OTHER PUBLICATIONS

PCT/CN2021/077645 international search report.

*Primary Examiner* — Christopher C Harris
(74) *Attorney, Agent, or Firm* — IPRO, PLLC (57) ABSTRACT

An operation behavior monitoring method includes: obtaining target historical operation behavior data of a target user, and performing data statistics on the target historical operation behavior data according to different dimensions, to build a multi-dimensional coordinate system; when a target operation behavior is received, determining a target data item corresponding to the target operation behavior in each dimension, determining whether a labeling point corresponding to the target data item exists in the multi-dimensional coordinate system or not; if yes, increasing the density of the labeling points by one; if not, determining a labeling point corresponding to the target data item in the multi-dimensional coordinate system, and setting the density of the labeling point to be 1; and calculating a center-of-gravity position corresponding to each coordinate axis according to the density of all the labeling points on each coordinate axis, determining a target point based on all the center-of-gravity positions.

20 Claims, 7 Drawing Sheets

(56) References Cited

U.S. PATENT DOCUMENTS 10,510,219 B1    12/2019  Zalewski et al.
10,721,239 B2 *   7/2020  Koottayi ................. G06N 20/00
11,165,800 B2 *  11/2021  Thampy .................. H04L 63/20

FOREIGN PATENT DOCUMENTS

| CN | 110075524 A | 8/2019 |
| CN | 110365708 A | 10/2019 |
| CN | 110795242 A | 2/2020 |
| CN | 110825818 A | 2/2020 |
| CN | 111753293 A | 10/2020 |

* cited by examiner

OPERATION BEHAVIOR MONITORING METHOD AND APPARATUS, ELECTRONIC DEVICE, AND STORAGE MEDIUM

The present disclosure claims the priority of Chinese patent application filed on Jun. 29, 2020 before the CNIPA, China National Intellectual Property Administration with the application number of 202010605998.3 and the title of "OPERATION BEHAVIOR MONITORING METHOD AND APPARATUS, ELECTRONIC DEVICE, AND STORAGE MEDIUM", which is incorporated herein in its entirety by reference.

TECHNICAL FIELD

The present disclosure relates to the technical field of servers and more particularly, to an operation behavior monitoring method and apparatus, an electronic device, and a computer-readable storage medium.

BACKGROUND

In the information age, tens of millions of users log in a variety of services through account numbers and passwords every moment. However, due to the inherent openness and resource sharing of the network, the phenomenon of account numbers and passwords being illegally used sometimes occurs. Especially when an account number and password of a network server or host is leaked, the server statically protected by the password may not identify the legitimacy of a user, which may cause great risks and losses to a server owner and relevant enterprises and institutions.

In a network payment scenario, a user behavior is sequentially mined by using a PrefixSpan association algorithm and stored in a feature database, and then the user behavior is sequentially matched to determine the confidence level of a user payment environment. In a network traffic scenario, user information to be detected characterized by a user traffic behavior is detected by matching therewith. A user behavior on a server (mainly a Linux operating system) is quite different from the foregoing scenario, and a user typically operates relevant resources by executing various commands.

Therefore, how to perform safety monitoring on a user operation behavior in a server is a technical problem to be solved by a person skilled in the art.

SUMMARY

The present disclosure aims to provide an operation behavior monitoring method and apparatus, an electronic device, and a computer-readable storage medium, which achieve safety monitoring of a user operation behavior in a server.

In order to achieve the above aims, the present disclosure provides an operation behavior monitoring method, including:

acquiring target historical operation behavior data of a target user, and performing data statistics on the target historical operation behavior data according to different dimensions so as to establish a multi-dimensional coordinate system, and coordinate axes in the multi-dimensional coordinate system are in one-to-one correspondence with the dimensions;

determining, in response to receiving a target operation behavior, a target data item corresponding to the target operation behavior in each of the dimensions, and determining whether a marking point corresponding to the target data item exists in the multi-dimensional coordinate system;

increasing a density of the marking point by one under the condition that the marking point corresponding to the target data item exists in the multi-dimensional coordinate system;

under the condition that the marking point corresponding to the target data item does not exist in the multi-dimensional coordinate system, determining the marking point corresponding to the target data item in the multi-dimensional coordinate system, and setting the density of the marking point to be one, and a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data; and calculating a center of gravity corresponding to each of the coordinate axes according to the density of all the marking points on each of the coordinate axes, and determining a target point based on all the centers of gravity so as to perform safety monitoring on the target operation behavior according to the position of the target point.

In an embodiment of the present disclosure, the performing data statistics on the target historical operation behavior data according to different dimensions so as to establish a multi-dimensional coordinate system includes:

performing the data statistics on the target historical operation behavior data according to different dimensions to obtain all data items contained in each of the dimensions and a frequency of each of the data items, and normalizing the frequency to obtain a standard frequency of each of the data items; and establishing a multi-dimensional coordinate system, and marking each of the data items on a coordinate axis corresponding to the dimension to which each of the data items belongs based on the standard frequency of each of the data items, and the coordinate axes in the multi-dimensional coordinate system are in one-to-one correspondence with the dimensions, $A=1-f_A$, A is the coordinate value of a marking position of the data item, and $f_A$ is the standard frequency of the data item.

In an embodiment of the present disclosure, after the marking each of the data items on a coordinate axis corresponding to the dimension to which each of the data items belongs based on the standard frequency of each of the data items, the method further includes:

determining a total number of data items corresponding to each of the coordinate axes, and calculating a unit distance p of each of the coordinate axes, and $p=1/S$, and S is the total number of the data items;

the determining a marking point corresponding to the target data item in the multi-dimensional coordinate system includes:

determining $B=1-f_B$ under the condition that the target data item exists in the target historical operation behavior data, and B is the coordinate value of the marking point of the target data item, and $f_B$ is the standard frequency of the target data item in the target historical operation behavior data; and determining $B=1+bp$ under the condition that the target data item does not exist in the target historical operation behavior data, and b is a positive integer and b is negatively correlated with the frequency of the target data item in the target operation behavior.

In an embodiment of the present disclosure, before the normalizing the frequency to obtain a standard frequency of each of the data items, the method further includes:

acquiring historical operation behavior data of all users, and determining duplicate data items in the historical operation behavior data of different users;

denoising the duplicate data items in the target historical operation behavior data according to principle that a higher frequency of the duplicate data items corresponds to a lower weight, so as to update the frequency of the data items;

the normalizing the frequency to obtain a standard frequency of each of the data items includes:

normalizing an updated frequency to obtain the standard frequency of each of the data items.

In an embodiment of the present disclosure, a frequency updating formula of the data item is:

$$f_0 = k \times \frac{f^2}{F} \times \frac{N}{n},$$

where $f_0$ is the updated frequency of the data item, f is an original frequency of the data item, F is a sum of the frequencies of the data items in historical operation behavior data corresponding to all users, N is the total number of the users, n is the total number of users who have the data item, and k is an experience coefficient.

In an embodiment of the present disclosure, the performing safety monitoring on the target operation behavior according to the position of the target point includes:

determining whether the target point is within a preset safe area, and determining that the target operation behavior is a safe operation behavior under the condition that the target point is within a preset safe area;

or, calculating a safe confidence level of the target operation behavior based on a distance between the target point and an original point in the multi-dimensional coordinate system, and the safe confidence level is negatively correlated with the distance between the target point and the original point in the multi-dimensional coordinate system.

In an embodiment of the present disclosure, the dimension includes a work directory, an operation instruction and a login identification.

In order to achieve the above aims, the present disclosure provides an operation behavior monitoring apparatus, including:

an establishment module, configured to acquire target historical operation behavior data of a target user, and perform data statistics on the target historical operation behavior data according to different dimensions so as to establish a multi-dimensional coordinate system, and coordinate axes in the multi-dimensional coordinate system are in one-to-one correspondence with the dimensions;

a determining module, configured to determine, in response to receiving a target operation behavior, a target data item corresponding to the target operation behavior in each of the dimensions, and determine whether a marking point corresponding to the target data item exists in the multi-dimensional coordinate system, and a work flow of a density updating module is started under the condition that the marking point corresponding to the target data item exists in the multi-dimensional coordinate system and a work flow of a determination module is started under the condition that the marking point corresponding to the target data item does not exist in the multi-dimensional coordinate system;

the density updating module, configured to increase the density of the marking point by one;

the determination module, configured to determine the marking point corresponding to the target data item in the multi-dimensional coordinate system, and set the density of the marking point to be one, and a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data; and a monitoring module, configured to calculate a center of gravity corresponding to each of the coordinate axes according to the density of all the marking points on each of the coordinate axes, and determine a target point based on all the centers of gravity so as to perform safety monitoring on the target operation behavior according to the position of the target point.

In order to achieve the above aims, the present disclosure provides electronic device, including:

a memory, configured to store a computer program; and a processor, configured to implement, when executing the computer program, the operations of the operation behavior monitoring method according to the above description.

In order to achieve the above aims, the present disclosure provides a computer-readable storage medium, storing a computer program which, when executed by a processor, implements the operations of the operation behavior monitoring method according to the above description.

From the above solution, it is apparent that the operation behavior monitoring method provided by the present disclosure includes: acquiring target historical operation behavior data of a target user, and performing data statistics on the target historical operation behavior data according to different dimensions so as to establish a multi-dimensional coordinate system, and coordinate axes in the multi-dimensional coordinate system are in one-to-one correspondence with the dimensions; determining, in response to receiving a target operation behavior, a target data item corresponding to the target operation behavior in each of the dimensions, and determining whether a marking point corresponding to the target data item exists in the multi-dimensional coordinate system; increasing the density of the marking point by one under the condition that the marking point corresponding to the target data item exists in the multi-dimensional coordinate system; under the condition that the marking point corresponding to the target data item does not exist in the multi-dimensional coordinate system, determining the marking point corresponding to the target data item in the multi-dimensional coordinate system, and setting the density of the marking point to be one, and a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data; and calculating a center of gravity corresponding to each of the coordinate axes according to the density of all the marking points on each of the coordinate axes, and determining a target point based on all the centers of gravity so as to perform safety monitoring on the target operation behavior according to the position of the target point.

According to the operation behavior monitoring method provided by the present disclosure, the historical operation behavior data is statistically processed according to different dimensions to establish the multi-dimensional coordinate system. Under the condition that the target operation behavior is received, the target operation behavior is converted into points in the established multi-dimensional coordinate system. The points closer to an original point represent a higher confidence level, and the points beyond a certain distance from the original point represent a higher risk. Thus, a user operation behavior is quantitatively analyzed and monitored. Apparently, according to the operation behavior monitoring method provided by the present disclosure, a safety confidence level of a user behavior is quantitatively analyzed through a multi-dimensional coordinate positioning scheme, an abnormal user behavior may be quickly monitored and identified, and risks may be prompted in time so as to reduce subsequent losses. The present disclosure also discloses an operation behavior monitoring apparatus, an electronic device and a computer-readable storage medium, which may also achieve the above technical effects.

It should be understood that the above general description and the following detailed description are only exemplary and not intended to limit the present disclosure.

BRIEF DESCRIPTION OF THE DRAWINGS

In order to more clearly describe the embodiments of the present disclosure or the technical solution in the prior art, the following will briefly introduce the drawings needed to be used in the embodiments or the prior technical description. Obviously, the drawings in the following description are only some embodiments of the present disclosure. For ordinary technicians in the art, they may also obtain other drawings based on these drawings without paying creative labor. The accompanying drawings are intended to provide a further understanding of the present disclosure and form a part of the specification. They are used to explain the present disclosure together with the following specific embodiments, but do not constitute a limitation on the present disclosure. In the attached drawings.

DETAILED DESCRIPTION OF THE EMBODIMENTS

The technical solutions in the embodiments of the present disclosure will be described clearly and completely below in combination with the drawings in the embodiments of the present disclosure. Obviously, the described embodiments are only part of the embodiments of the present disclosure, not all of them. Based on the embodiments in the present disclosure, all other embodiments obtained by ordinary technicians in the art without doing creative work belong to the scope of protection in the present disclosure.

An embodiment of the present disclosure discloses an operation behavior monitoring method, which achieves safety monitoring of a user operation behavior in a server.

Figure 1:
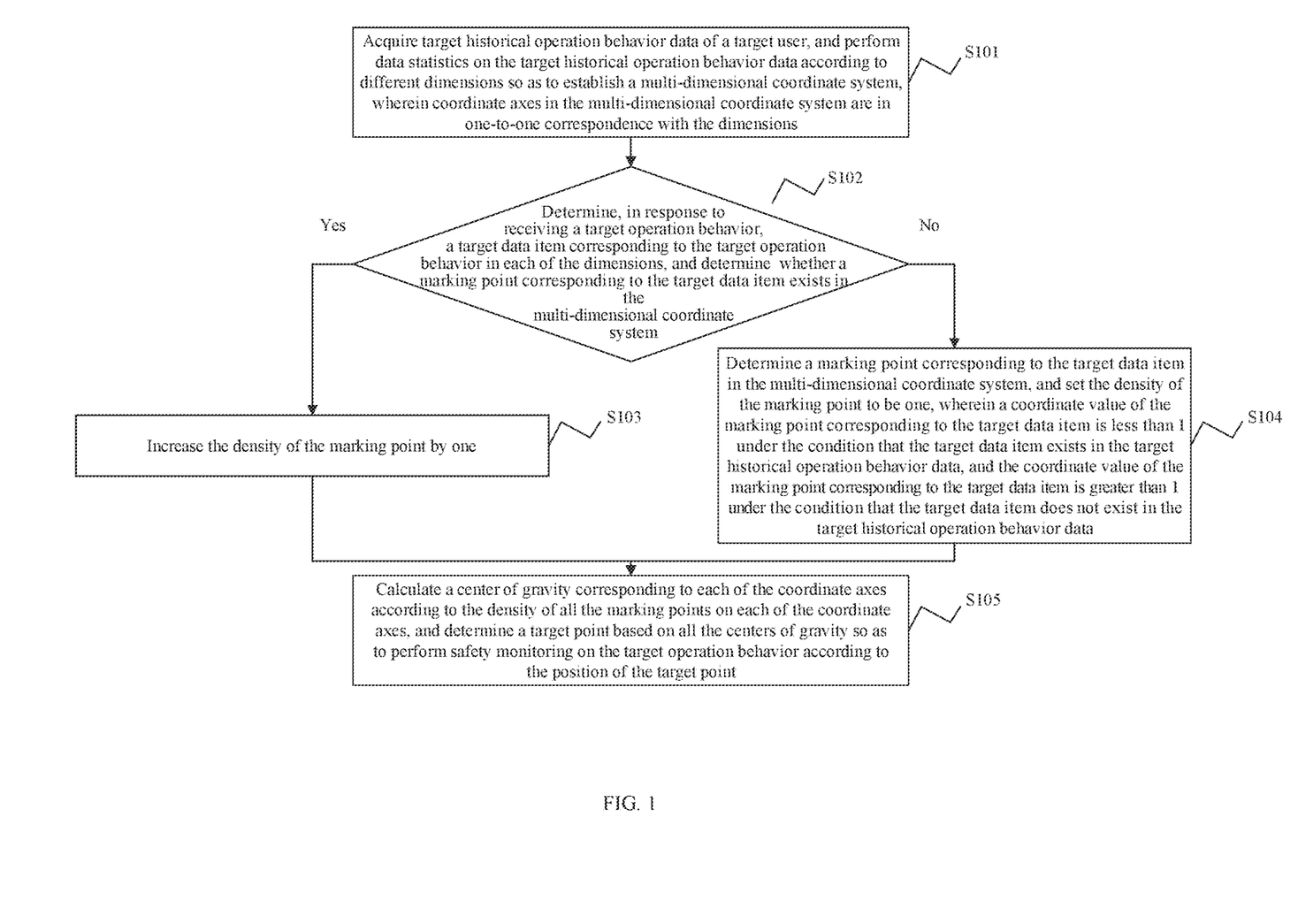
FIG. 1 shows a flow chart of an operation behavior monitoring method according to an exemplary embodiment.

FIG. 1 shows a flow chart of an operation behavior monitoring method according to an exemplary embodiment. As shown in FIG. 1, the method includes the following operations:

S101: acquiring target historical operation behavior data of a target user, and performing data statistics on the target historical operation behavior data according to different dimensions so as to establish a multi-dimensional coordinate system, wherein coordinate axes in the multi-dimensional coordinate system are in one-to-one correspondence with the dimensions.

In the present embodiment, operation behavior data of a target user logging in a server within a period of time, i.e., target historical operation behavior data, is acquired, data statistics is performed thereon according to different dimensions, all data items contained in the target historical operation behavior data are obtained, and data items corresponding to the respective dimensions are determined. A multi-dimensional coordinate system is established based on a frequency of each data item, and coordinate axes in the multi-dimensional coordinate system are in one-to-one correspondence with the dimensions.

The dimension herein may include a work directory, an operation instruction and a login identification. A work directory refers to a file directory where a user executes some operation commands on a Linux system, and represents a file tree location where the user executes the commands, such as "/root/foo", "/etc/bar", or "/home/userA", and so on. The operation instruction refers to an operation instruction input by the user after logging in the Linux operating system, such as "cd/root/foo", "who am i", or "hdfs dfs -ls/bar", and so on.

S102: determining, in response to receiving a target operation behavior, a target data item corresponding to the target operation behavior in each of the dimensions, and determining whether a marking point corresponding to the target data item exists in the multi-dimensional coordinate system; if yes, proceeding to S103; if no, proceeding to S104.

S103: increasing the density of the marking point by one.

S104: determining a marking point corresponding to the target data item in the multi-dimensional coordinate system, and setting the density of the marking point to be one, wherein a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data.

In a specific implementation, under the condition that a target operation behavior is received, the target operation behavior is converted into points in the multi-dimensional coordinate system. Firstly, a target data item corresponding to a target operation behavior in each dimension is determined. Then, each target data item is marked in a multi-dimensional coordinate system. That is, a marking point corresponding to the target data item is determined on a coordinate axis corresponding to the dimension to which each target data item belongs, and the density of each target data item is determined.

Specifically, if the target data item exists in the target historical behavior data, a coordinate value of the marking point corresponding to the target data item is less than 1. In an aspect of the present disclosure, the coordinate value of the marking point corresponding to the target data item is negatively correlated with the frequency thereof in the target historical behavior data. That is, as the frequency of the target data item in the target historical behavior data is higher, the coordinate value of the marking point corresponding thereto is less and the distance to an original point is shorter. If the target data item does not exist in the target historical behavior data, a coordinate value of the marking point corresponding to the target data item is greater than 1. In an aspect of the present disclosure, the coordinate value of the marking point corresponding to the target data item is negatively correlated with the frequency thereof in all target operation behaviors. That is, as the frequency of the target data item in all the target operation behaviors is higher, the coordinate value of the marking point corresponding thereto is less and closer to 1.

For example, the work directory corresponds to an x-axis of the multi-dimensional coordinate system, the operation instruction corresponds to a y-axis, the login identification corresponds to a z-axis, and the data items corresponding to the target operation behavior in each dimension are: work directory A, operation instruction B and login identification C. If work directory A and operation instruction B exist in the target historical operation behavior data, the marking point of work directory A is located at [0, 1] on the x-axis, the marking point of operation instruction B is located at [0, 1] on the y-axis, and the marking point of login identification C is located at a position greater than 1 on the z-axis.

S105: calculating a center of gravity corresponding to each of the coordinate axes according to the density of all the marking points on each of the coordinate axes, and determining a target point based on all the centers of gravity so as to perform safety monitoring on the target operation behavior according to the position of the target point.

In this operation, the center of gravity corresponding to each coordinate axis is calculated by using the following calculation formula:

$$P_c = \frac{\sum_{i=0}^{n} P_i \cdot C_i}{\sum_{i=0}^{n} P_i},$$

where $P_c$ is the center of gravity, $P_i$ is the density of the marking point, and $C_i$ is the coordinate value of the marking point.

A target point may be uniquely determined based on the center of gravity of each coordinate axis, and safety monitoring may be performed on the target operation behavior based on the position of the target point. As a feasible implementation, the operation of performing safety monitoring on the target operation behavior according to the position of the target point may include: determining whether the target point is within a preset safe area, and determining that the target operation behavior is a safe operation behavior under the condition that the target point is within a preset safe area. As another feasible implementation, the operation of performing safety monitoring on the target operation behavior according to the position of the target point may include: calculating a safe confidence level of the target operation behavior based on a distance between the target point and an original point in the multi-dimensional coordinate system, wherein the safe confidence level is negatively correlated with the distance between the target point and the original point in the multi-dimensional coordinate system.

According to the operation behavior monitoring method provided by the embodiment of the present disclosure, the historical operation behavior data is subjected to statistics according to different dimensions to establish a multi-dimensional coordinate system. Under the condition that a target operation behavior is received, the target operation behavior is converted into points in the established multi-dimensional coordinate system. The points closer to an original point represent a higher confidence level, and the points beyond a certain distance from the original point represent a higher risk. Thus, a user operation behavior is quantitatively analyzed and monitored. Apparently, according to the operation behavior monitoring method provided by the embodiment of the present disclosure, a safety confidence level of a user behavior is quantitatively analyzed through a multi-dimensional coordinate positioning scheme, an abnormal user behavior may be quickly monitored and identified, and risks may be prompted in time so as to reduce subsequent losses.

Figure 2:
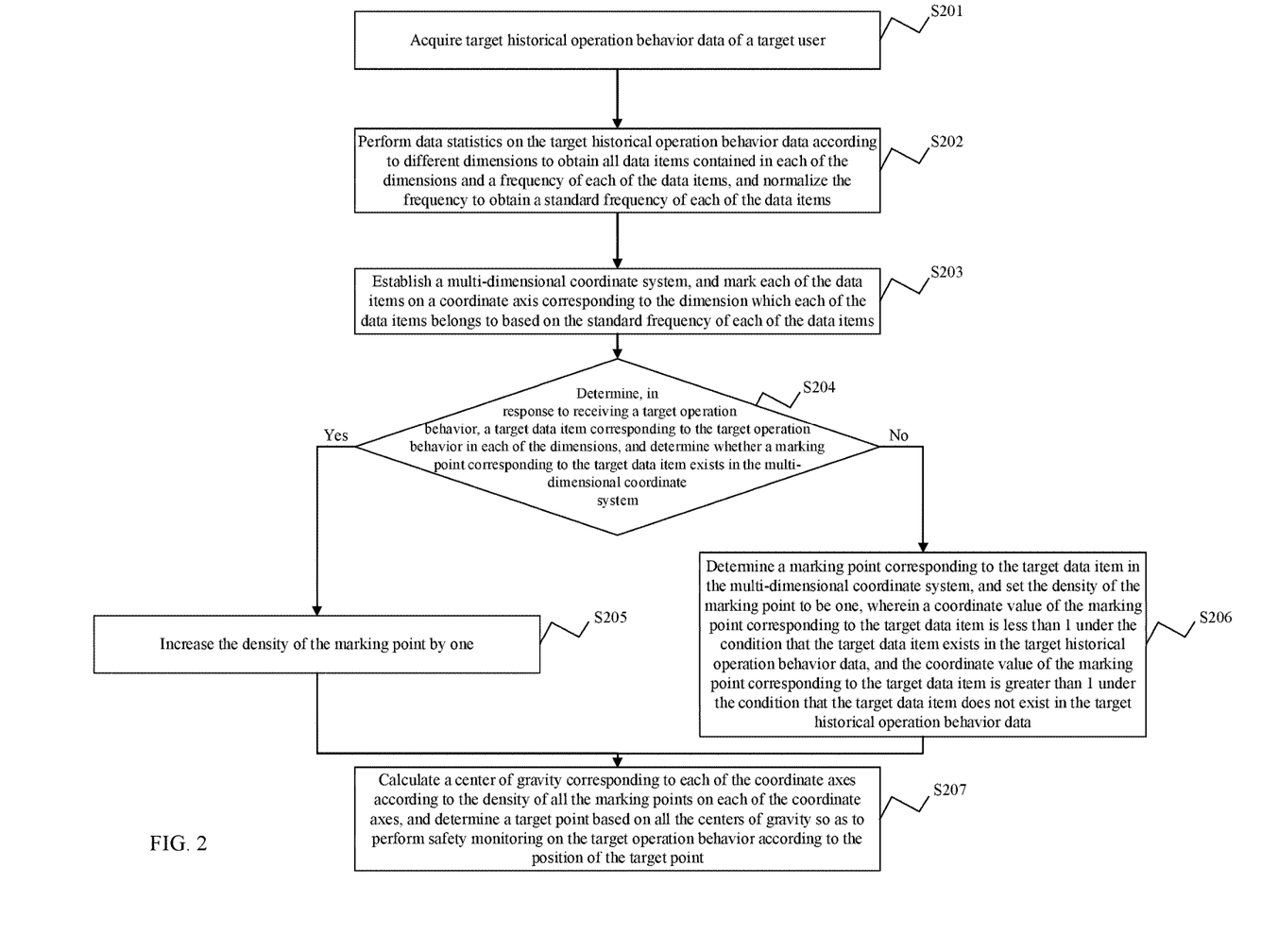
FIG. 2 shows a flow chart of another operation behavior monitoring method according to an exemplary embodiment.

An embodiment of the present disclosure discloses an operation behavior monitoring method. The present embodiment further describes and optimizes the technical solution as compared to the previous embodiment. Specifically:

FIG. 2 shows a flow chart of another operation behavior monitoring method according to an exemplary embodiment. As shown in FIG. 2, the method includes the following operations:

S201: acquiring target historical operation behavior data of a target user.

S202: performing data statistics on the target historical operation behavior data according to different dimensions to obtain all data items contained in each of the dimensions and a frequency of each of the data items, and normalizing the frequency to obtain a standard frequency of each of the data items.

S203: establishing a multi-dimensional coordinate system, and marking each of the data items on a coordinate axis corresponding to the dimension to which each of the data items belongs based on the standard frequency of each of the data items.

The coordinate axes in the multi-dimensional coordinate system are in one-to-one correspondence with the dimensions, $A=1-f_A$, A is the coordinate value of a marking position of the data item, and $f_A$ is the standard frequency of the data item.

In the present embodiment, the data items in the target historical operation behavior data need to be marked in [0, 1] on the coordinate axis corresponding to the dimension to which the data items belong. Therefore, the frequency of each data item needs to be normalized to obtain a standard frequency.

In an aspect of the present disclosure, before the normalizing the frequency to obtain a standard frequency of each of the data items, the method further includes: acquiring historical operation behavior data of all users, and determining duplicate data items in the historical operation behavior data of different users; and denoising duplicate data items in the target historical operation behavior data according to principle that a higher frequency of the duplicate data items corresponds to a lower weight, so as to update the frequency of the data items. Accordingly, the normalizing the frequency to obtain a standard frequency of each of the data items includes: normalizing the updated frequency to obtain the standard frequency of each of the data items.

In a specific implementation, the historical operation behavior data of all users is acquired, the frequency of each data item is statistically processed across users, and duplicate data items contained in different users are denoised based on the principle that a higher frequency of the duplicate data items corresponds to a lower weight, so as to update the frequency of the duplicate data items in the target historical operation behavior. A frequency updating formula of the data item is:

$$f_0 = k \times \frac{f^2}{F} \times \frac{N}{n},$$

where $f_0$ is the updated frequency of the data item, f is the original frequency of the data item, F is the sum of the frequencies of the data items in historical operation behavior data corresponding to all users, N is the total number of users, n is the total number of users who have the data item, and k is an experience coefficient, and may be adjusted according to the importance of the data item in the technical field to which the target user belongs.

The formula of normalization is:

$$f_A = \frac{f_0 - \text{Min}}{\text{Max} - \text{Min}},$$

where Max is a frequency maximum, and Min is a frequency minimum.

A coordinate value A of a marking position of the data item is negatively correlated with the standard frequency thereof. Specifically, $A=1-f_A$, A is the coordinate value of the marking position of the data item, and $f_A$ is the standard frequency of the data item.

S204: determining, in response to receiving a target operation behavior, a target data item corresponding to the target operation behavior in each of the dimensions, and determining whether a marking point corresponding to the target data item exists in the multi-dimensional coordinate system; if yes, proceeding to S205; if no, proceeding to S206.

S205: increasing the density of the marking point by one.

S206: determining a marking point corresponding to the target data item in the multi-dimensional coordinate system, and setting the density of the marking point to be one, wherein a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data.

In the present embodiment, the distance between marking positions of target data items that do not exist in the target historical operation behavior data may be correlated with a unit distance between the corresponding coordinate axes. Specifically, after the marking each of the data items on a coordinate axis corresponding to the dimension to which each of the data items belongs based on the standard frequency of each of the data items, the method further includes: determining a total number of data items corresponding to each of the coordinate axes, and calculating a unit distance p of each of the coordinate axes, wherein p=1/S, and S is the total number of the data items.

Accordingly, the determining a marking point corresponding to the target data item in the multi-dimensional coordinate system includes: determining $B=1-f_B$ under the condition that the target data item exists in the target historical operation behavior data, wherein B is the coordinate value of the marking point of the target data item, and $f_B$ is the standard frequency of the target data item in the target historical operation behavior data; and determining $B=1+bp$ under the condition that the target data item does not exist in the target historical operation behavior data, wherein b is a positive integer and b is negatively correlated with the frequency of the target data item in the target operation behavior.

In a specific implementation, the coordinate value of the marking point of a target data item that does not exist in the target historical operation behavior data is negatively correlated with the frequency thereof in the target operation behavior. As the frequency of the target data item in all the target operation behaviors is higher, the coordinate value of the marking point corresponding thereto is less and closer to 1, and the distance between the marking points corresponding to the respective target data items is an integer multiple of the unit distance between the corresponding coordinate axes.

S207: calculating a center of gravity corresponding to each of the coordinate axes according to the density of all the marking points on each of the coordinate axes, and determining a target point based on all the centers of gravity so as to perform safety monitoring on the target operation behavior according to the position of the target point.

Figure 3:
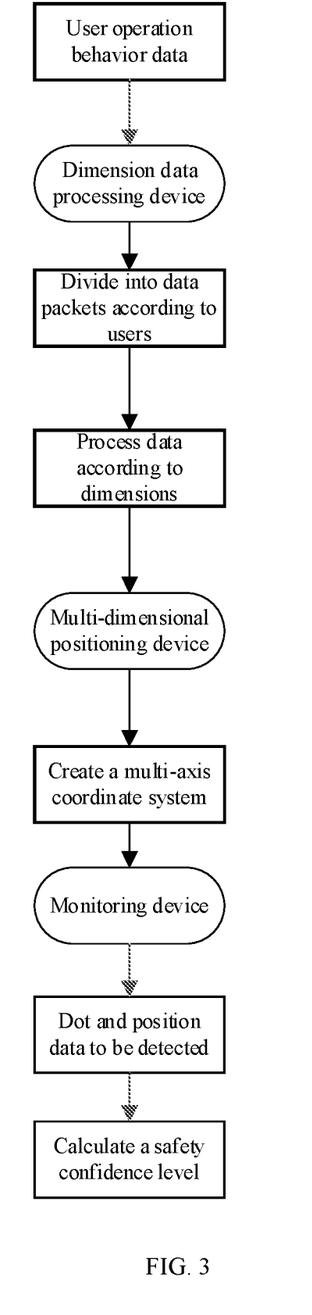
FIG. 3 shows a schematic overall flow chart of an application embodiment according to the present disclosure.

An application embodiment provided by the present disclosure is described below, and implemented by a dimension data processing device, a multi-dimensional positioning device and a monitoring device. A schematic overall flow chart is shown in FIG. 3.

Figure 4:
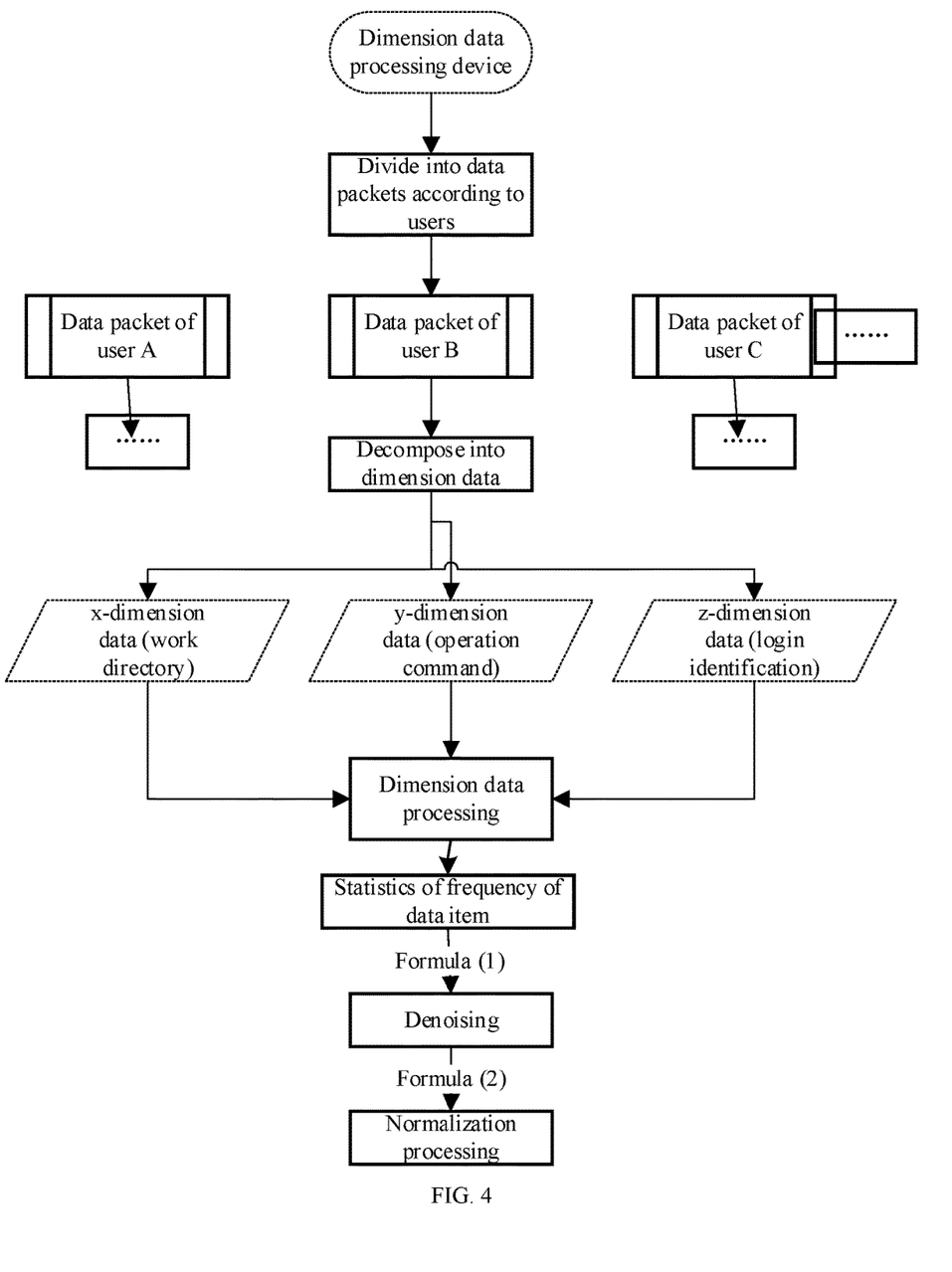
FIG. 4 is a schematic diagram of detailed operations of a dimension data processing device.

The dimension data processing device is configured to divide historical operation behaviors of server users within a period of time into different data packets according to the users, divide each data packet into three dimensions according to "work directory", "operation instruction" and "login identification", and statistically process, denoise and normalize data in each dimension. A schematic diagram of detailed operations of the device is shown in FIG. 4. The detailed operations may be as follows:

Step 1: classifying user data according to dimensions, and statistically processing a frequency of occurrence of each data item.

Step 2: statistically processing the frequency of each data item across user classifications, and denoising duplicate data items under different user classifications according to the principle that a lower weight corresponds to a higher frequency of the duplicate data items, as follows:

$$f_0 = k \times \frac{f^2}{F} \times \frac{N}{n}$$

where $f_0$ is the updated frequency of the data item, f is the original frequency of the data item, F is the sum of the frequencies of the data items in historical operation behavior data corresponding to all users, N is the total number of users, n is the total number of users who have the data item, and k is an experience coefficient within a value range of 0.5-2.0 generally.

Step 3: mapping, in each dimension, the frequency values of the data items in sub-step 2 into [0, 1] by using a "minimal-maximal normalization" method according to the dimensions, the processing method being as follows:

$$f_0' = \frac{f_0 - \text{Min}}{\text{Max} - \text{Min}},$$

where Max is a frequency maximum, and Min is a frequency minimum.

The multi-dimensional positioning device is configured to reversely mark the data items on each coordinate axis by using three dimension data: work directory, operation instruction and login identification as x, y and z axes of a three-axis coordinate system and $(1-f_0')$ as a coordinate value, and maintain a binding relationship between the data items and scale values of the coordinate axes corresponding thereto.

Figure 5:
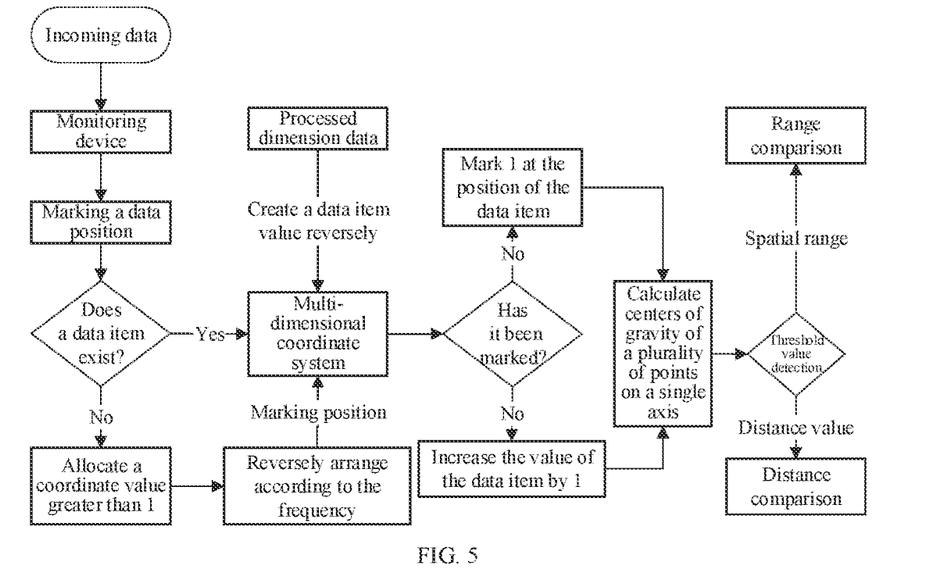
FIG. 5 is a schematic diagram of detailed operations of a monitoring device.

The monitoring device is configured to dot incoming data on each dimension axis according to equal or similar data items. A schematic diagram of detailed operations of the device is shown in FIG. 5:

A. directly marking a position point $C_i$ if the data item exists.

B. marking the item at the position point $C_i$ after 1 if the data item does not exist, different items being in a descending order of frequency.

C. increasing the value of the point by 1 if the position point is marked, and recording this value as density $P_i$ of the point.

D. obtaining centers of gravity $P_c$ of a plurality of points on the same dimension axis according to the following formula:

$$P_c = \frac{\sum_{i=0}^{n} P_i \cdot C_i}{\sum_{i=0}^{n} P_i},$$

where $P_i$ is the density of the marking point.

According to the three $P_c$ values marked, the distance between the uniquely determined point thereof and an original point is calculated. As the distance is greater, the safety confidence level is lower. A distance threshold value may be set, or a spatial range represents a safe area. If the threshold value or the safe area is exceeded, a next operation prompting risks is considered to be reached.

An operation behavior monitoring apparatus provided by an embodiment of the present disclosure will be introduced below. The operation behavior monitoring apparatus described below and the operation behavior monitoring method described above may be referred to each other.

Figure 6:
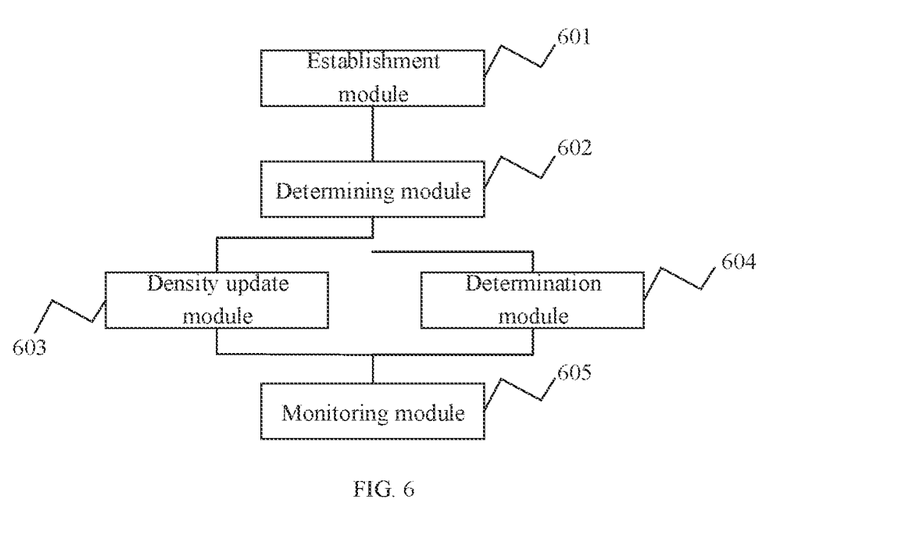
FIG. 6 shows a structural diagram of an operation behavior monitoring apparatus according to an exemplary embodiment.

FIG. 6 shows a structural diagram of an operation behavior monitoring apparatus according to an exemplary embodiment. As shown in FIG. 6, the apparatus includes:

an establishment module 601, configured to acquire target historical operation behavior data of a target user, and perform data statistics on the target historical operation behavior data according to different dimensions so as to establish a multi-dimensional coordinate system, wherein coordinate axes in the multi-dimensional coordinate system are in one-to-one correspondence with the dimensions;

a determining module 602, configured to determine, in response to receiving a target operation behavior, a target data item corresponding to the target operation behavior in each of the dimensions, and determine whether a marking point corresponding to the target data item exists in the multi-dimensional coordinate system, wherein a work flow of a density updating module 603 is started under the condition that the marking point corresponding to the target data item exists in the multi-dimensional coordinate system and a work flow of a determination module 604 is started under the condition that the marking point corresponding to the target data item does not exist in the multi-dimensional coordinate system;

the density updating module 603, configured to increase the density of the marking point by one;

the determination module 604, configured to determine the marking point corresponding to the target data item in the multi-dimensional coordinate system, and set the density of the marking point to be one, wherein a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data; and a monitoring module 605, configured to calculate a center of gravity corresponding to each of the coordinate axes according to the density of all the marking points on each of the coordinate axes, and determine a target point based on all the centers of gravity so as to perform safety monitoring on the target operation behavior according to the position of the target point.

According to the operation behavior monitoring apparatus provided by the embodiment of the present disclosure, historical operation behavior data is subjected to statistics according to different dimensions to establish a multi-dimensional coordinate system. Under the condition that a target operation behavior is received, the target operation behavior is converted into points in the established multi-dimensional coordinate system. The points closer to an original point represent a higher confidence level, and the points beyond a certain distance from the original point represent a higher risk. Thus, a user operation behavior is quantitatively analyzed and monitored. Apparently, according to the operation behavior monitoring apparatus provided by the embodiment of the present disclosure, a safety confidence level of a user behavior is quantitatively analyzed through a multi-dimensional coordinate positioning scheme, an abnormal user behavior may be quickly monitored and identified, and risks may be prompted in time so as to reduce subsequent losses.

On the basis of the above embodiment, as an implementation, the establishment module 601 includes:

an acquisition unit, configured to acquire target historical operation behavior data of a target user;

a statistical unit, configured to perform data statistics on the target historical operation behavior data according to different dimensions to obtain all data items contained in each of the dimensions and a frequency of each of the data items, and normalize the frequency to obtain a standard frequency of each of the data items; and an establishment unit, configured to establish a multi-dimensional coordinate system, and mark each of the data items on a coordinate axis corresponding to the dimension to which each of the data items belongs based on the standard frequency of each of the data items, wherein the coordinate axes in the multi-dimensional coordinate system are in one-to-one correspondence with the dimensions, $A=1-f_A$, A is the coordinate value of a marking position of the data item, and $f_A$ is the standard frequency of the data item.

On the basis of the above embodiment, as an implementation, the establishment module 601 also includes:

a first calculation unit, configured to determine a total number of data items corresponding to each of the coordinate axes, and calculate a unit distance p of each of the coordinate axes, wherein p=1/S, and S is the total number of the data items.

Accordingly, the determining module 604 includes:

a first determination unit, configured to determine $B=1-f_B$ under the condition that the target data item exists in the target historical operation behavior data, B being the coordinate value of the marking point of the target data item, and $f_B$ being the standard frequency of the target data item in the target historical operation behavior data;

a second determination unit, configured to determine B=1+bp under the condition that the target data item does not exist in the target historical operation behavior data, b being a positive integer and b being negatively correlated with the frequency of the target data item in the target operation behavior; and a density setting unit, configured to set the density of the marking point to be one.

On the basis of the above embodiment, as an implementation, the statistical unit includes:

a statistical subunit, configured to perform data statistics on the target historical operation behavior data according to different dimensions to obtain all data items contained in each of the dimensions and a frequency of each of the data items;

a determination subunit, configured to acquire historical operation behavior data of all users, and determine duplicate data items in the historical operation behavior data of different users;

an updating subunit, configured to denoise duplicate data items in the target historical operation behavior data according to principle that a higher frequency of the duplicate data items corresponds to a lower weight, so as to update the frequency of the data items; and a normalization subunit, configured to normalize the updated frequency to obtain the standard frequency of each of the data items.

On the basis of the above embodiment, as an implementation, a frequency updating formula of the data item is:

$$f_0 = k \times \frac{f^2}{F} \times \frac{N}{n},$$

where $f_0$ is the updated frequency of the data item, f is the original frequency of the data item, F is the sum of the frequencies of the data items in historical operation behavior data corresponding to all users, N is the total number of users, n is the total number of users who have the data item, and k is an experience coefficient.

On the basis of the above embodiment, as an implementation, the monitoring module 605 includes:

a second calculation unit, configured to calculate a center of gravity corresponding to each of the coordinate axes according to the density of all the marking points on each of the coordinate axes, and determine a target point based on all the centers of gravity; and a determining unit, configured to determine whether the target point is within a preset safe area, and determine that the target operation behavior is a safe operation behavior under the condition that the target point is within a preset safe area.

On the basis of the above embodiment, as an implementation, the monitoring module 605 includes:

a second calculation unit, configured to calculate a center of gravity corresponding to each of the coordinate axes according to the density of all the marking points on each of the coordinate axes, and determine a target point based on all the centers of gravity; and a third calculation unit, configured to calculate a safe confidence level of the target operation behavior based on a distance between the target point and an original point in the multi-dimensional coordinate system, wherein the safe confidence level is negatively correlated with the distance between the target point and the original point in the multi-dimensional coordinate system.

On the basis of the above embodiment, as an implementation, the dimension includes a work directory, an operation instruction and a login identification.

The specific manner in which the various modules of the apparatus in the above embodiment perform operations has been described in detail in the embodiment of the method, and will not be described in detail herein.

Figure 7:
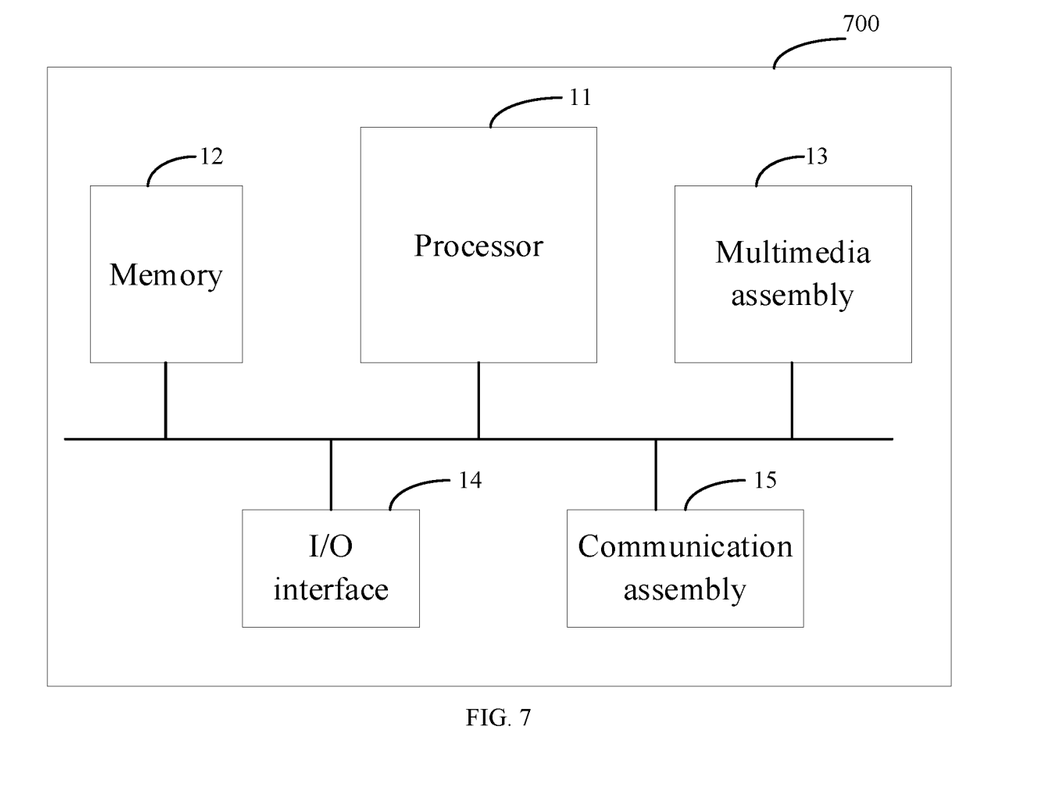
FIG. 7 shows a structural diagram of an electronic device according to an exemplary embodiment.

The present disclosure also provides an electronic device. FIG. 7 shows a structural diagram of an electronic device 700 according to an exemplary embodiment. As shown in FIG. 7, the electronic device may include a processor 11 and a memory 12. The electronic device 700 may also include one or more of a multimedia assembly 13, an Input/Output (I/O) interface 14, and a communication assembly 15.

The processor 11 is configured to control an overall operation of the electronic device 700 so as to complete all or part of the operations in the above operation behavior monitoring method. The memory 12 is configured to store various types of data to support the operation at the electronic device 700. The data may include, for example, instructions for any application or method operating on the electronic device 700, as well as application-related data, such as contact data, transmitted and received messages, pictures, audio, and video. The memory 12 may be implemented by any type of volatile or non-volatile storage apparatus or combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk. The multimedia assembly 13 may include a screen and an audio assembly. The screen may be, for example, a touch screen, and the audio assembly is configured to output and/or input audio signals. For example, the audio assembly may include a microphone for receiving external audio signals. The received audio signals may be further stored in the memory 12 or transmitted via the communication assembly 15. The audio assembly also includes at least one speaker for outputting the audio signals. The I/O interface 14 is an interface provided between the processor 11 and other interface modules such as a keyboard, a mouse or buttons. These buttons may be virtual buttons or physical buttons. The communication assembly 15 is configured to perform wired or wireless communication between the electronic device 700 and other apparatuses. The wireless communication, such as Wi-Fi, Bluetooth, Near Field Communication (NFC), 2G, 3G or 4G, or one or a combination thereof. Therefore, the communication assembly 15 may include a Wi-Fi module, a Bluetooth module and an NFC module accordingly.

In an exemplary embodiment, the electronic device 700 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, micro control units, micro processing units, or other electronic components to perform the above operation behavior monitoring method.

Figure 8:
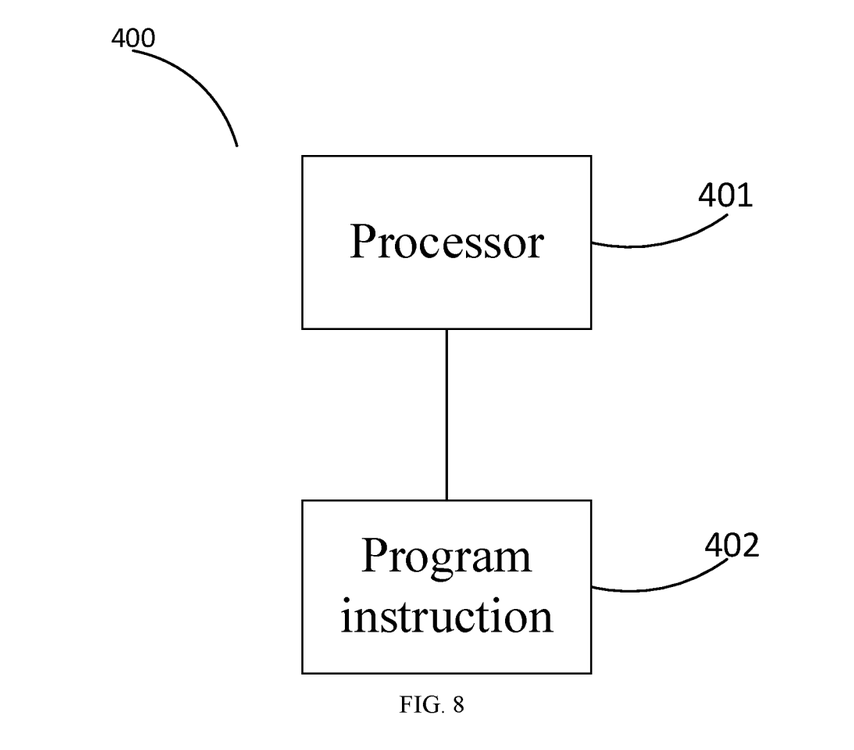
FIG. 8 shows a structural diagram of a computer-readable storage medium according to an exemplary embodiment.

In another exemplary embodiment, there is also provided a computer-readable storage medium 400 including a program instruction 402. As shown in FIG. 8, the program instruction 402, when executed by a processor 401, implements the operations of the above operation behavior monitoring method. For example, the computer-readable storage medium 400 may be the memory 12 including the above program instruction that is executable by the processor 11 of the electronic device 700 to complete the above operation behavior monitoring method.

In the specification, each embodiment is described in a progressive manner. Each embodiment focuses on the differences with other embodiments. The same and similar parts of each embodiment may be referred to each other. For the device disclosed in the embodiment, since it corresponds to the method disclosed in the embodiment, the description is relatively simple. Please refer to the description of the method section for details. It should be pointed out that for ordinary technicians in the technical field, without departing from the principles of the present disclosure, a number of improvements and modifications may be made to the present disclosure, which also fall within the protection scope of the claims of the present disclosure.

It should also be noted that in this specification, relational terms such as first and second are only used to distinguish one entity or operation from another entity or operation, and do not necessarily require or imply any such actual relationship or order between these entities or operations. Moreover, the terms "including", "comprising" or any other variant thereof are intended to cover non-exclusive inclusion, so that a process, method, article or equipment including a series of elements not only includes those elements, but also includes other elements not explicitly listed, or also includes elements inherent to such process, method, article or equipment. Without further restrictions, the elements defined by the statement "including one . . . " do not exclude that there are other identical elements in the process, method, article or equipment including the elements.

The invention claimed is:

1. An operation behavior monitoring method, comprising:
acquiring target historical operation behavior data of a target user, and performing data statistics on the target historical operation behavior data according to different dimensions to establish a multi-dimensional coordinate system, wherein coordinate axes in the multi-dimensional coordinate system are in one-to-one correspondence with the dimensions;
determining, in response to receiving a target operation behavior, a target data item corresponding to the target operation behavior in each of the dimensions, and determining whether a marking point corresponding to the target data item exists in the multi-dimensional coordinate system;
increasing a density of the marking point by one under the condition that the marking point corresponding to the target data item exists in the multi-dimensional coordinate system;
under the condition that the marking point corresponding to the target data item does not exist in the multi-dimensional coordinate system, determining the marking point corresponding to the target data item in the multi-dimensional coordinate system, and setting the density of the marking point to be one, wherein a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data; and
calculating a center of gravity corresponding to each of the coordinate axes according to the density of all the marking points on each of the coordinate axes, and determining a target point based on all the centers of gravity to perform safety monitoring on the target operation behavior according to the position of the target point.

2. The operation behavior monitoring method according to claim 1, wherein the performing data statistics on the target historical operation behavior data according to different dimensions to establish a multi-dimensional coordinate system comprises:
performing the data statistics on the target historical operation behavior data according to different dimensions to obtain all data items contained in each of the dimensions and a frequency of each of the data items, and normalizing the frequency to obtain a standard frequency of each of the data items; and
establishing a multi-dimensional coordinate system, and marking each of the data items on a coordinate axis corresponding to the dimension to which each of the data items belongs based on the standard frequency of each of the data items, wherein the coordinate axes in the multi-dimensional coordinate system are in one-to-one correspondence with the dimensions, $A=1-f_A$, A is the coordinate value of a marking position of the data item, and $f_A$ is the standard frequency of the data item.

3. The operation behavior monitoring method according to claim 2, wherein after the marking each of the data items on a coordinate axis corresponding to the dimension to which each of the data items belongs based on the standard frequency of each of the data items, the method further comprises:
determining a total number of data items corresponding to each of the coordinate axes, and calculating a unit distance p of each of the coordinate axes, wherein p=1/S, and S is the total number of the data items;
the determining a marking point corresponding to the target data item in the multi-dimensional coordinate system comprises:
determining $B=1-f_B$ under the condition that the target data item exists in the target historical operation behavior data, wherein B is the coordinate value of the marking point of the target data item, and $f_B$ is the standard frequency of the target data item in the target historical operation behavior data; and
determining B=1+bp under the condition that the target data item does not exist in the target historical operation behavior data, wherein b is a positive integer and b is negatively correlated with the frequency of the target data item in the target operation behavior.

4. The operation behavior monitoring method according to claim 2, wherein before the normalizing the frequency to obtain a standard frequency of each of the data items, the method further comprises:
acquiring historical operation behavior data of all users, and determining duplicate data items in the historical operation behavior data of different users;
denoising the duplicate data items in the target historical operation behavior data according to principle that a higher frequency of the duplicate data items corresponds to a lower weight, to update the frequency of the data items;
the normalizing the frequency to obtain a standard frequency of each of the data items comprises:
normalizing an updated frequency to obtain the standard frequency of each of the data items.

5. The operation behavior monitoring method according to claim 4, wherein a frequency updating formula of the data item is:

$$f_0 = k \times \frac{f^2}{F} \times \frac{N}{n},$$

wherein $f_0$ is the updated frequency of the data item, f is an original frequency of the data item, F is a sum of the frequencies of the data items in historical operation behavior data corresponding to all users, N is the total number of the users, n is the total number of users who have the data item, and k is an experience coefficient.

6. The operation behavior monitoring method according to claim 1, wherein the performing safety monitoring on the target operation behavior according to the position of the target point comprises:
determining whether the target point is within a preset safe area, and determining that the target operation behavior is a safe operation behavior under the condition that the target point is within a preset safe area;
or, calculating a safe confidence level of the target operation behavior based on a distance between the target point and an original point in the multi-dimensional coordinate system, wherein the safe confidence level is negatively correlated with the distance between the target point and the original point in the multi-dimensional coordinate system.

7. The operation behavior monitoring method according to claim 1, wherein the dimensions comprise a work directory, an operation instruction and a login identification.

8. An electronic device, comprising:
a memory, configured to store a computer program; and
a processor, when executing the computer program, configured for:
acquiring target historical operation behavior data of a target user, and performing data statistics on the target historical operation behavior data according to different dimensions to establish a multi-dimensional coordinate system, wherein coordinate axes in the multi-dimensional coordinate system are in one-to-one correspondence with the dimensions;
determining, in response to receiving a target operation behavior, a target data item corresponding to the target operation behavior in each of the dimensions, and
determining whether a marking point corresponding to the target data item exists in the multi-dimensional coordinate system;
increasing a density of the marking point by one under the condition that the marking point corresponding to the target data item exists in the multi-dimensional coordinate system;
under the condition that the marking point corresponding to the target data item does not exist in the multi-dimensional coordinate system, determining the marking point corresponding to the target data item in the multi-dimensional coordinate system, and setting the density of the marking point to be one, wherein a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data; and
calculating a center of gravity corresponding to each of the coordinate axes according to the density of all the marking points on each of the coordinate axes, and determining a target point based on all the centers of gravity to perform safety monitoring on the target operation behavior according to the position of the target point.

9. The electronic device according to claim 8, wherein the performing data statistics on the target historical operation behavior data according to different dimensions to establish a multi-dimensional coordinate system comprises:
performing the data statistics on the target historical operation behavior data according to different dimensions to obtain all data items contained in each of the dimensions and a frequency of each of the data items, and normalizing the frequency to obtain a standard frequency of each of the data items; and
establishing a multi-dimensional coordinate system, and marking each of the data items on a coordinate axis corresponding to the dimension to which each of the data items belongs based on the standard frequency of each of the data items, wherein the coordinate axes in the multi-dimensional coordinate system are in one-to-one correspondence with the dimensions, $A=1-f_A$, A is the coordinate value of a marking position of the data item, and $f_A$ is the standard frequency of the data item.

10. The electronic device according to claim 9, wherein after the marking each of the data items on a coordinate axis corresponding to the dimension to which each of the data items belongs based on the standard frequency of each of the data items, the processor is further configured for:
determining a total number of data items corresponding to each of the coordinate axes, and calculating a unit distance p of each of the coordinate axes, wherein p=1/S, and S is the total number of the data items;
the determining a marking point corresponding to the target data item in the multi-dimensional coordinate system comprises:
determining $B=1-f_B$ under the condition that the target data item exists in the target historical operation behavior data, wherein B is the coordinate value of the marking point of the target data item, and $f_B$ is the standard frequency of the target data item in the target historical operation behavior data; and
determining B=1+bp under the condition that the target data item does not exist in the target historical operation behavior data, wherein b is a positive integer and b is negatively correlated with the frequency of the target data item in the target operation behavior.

11. The electronic device according to claim 9, wherein before the normalizing the frequency to obtain a standard frequency of each of the data items, the processor is further configured for:

acquiring historical operation behavior data of all users, and determining duplicate data items in the historical operation behavior data of different users;

denoising the duplicate data items in the target historical operation behavior data according to principle that a higher frequency of the duplicate data items corresponds to a lower weight, to update the frequency of the data items;

the normalizing the frequency to obtain a standard frequency of each of the data items comprises:

normalizing an updated frequency to obtain the standard frequency of each of the data items.

12. The electronic device according to claim 11, wherein a frequency updating formula of the data item is:

$$f_0 = k \times \frac{f^2}{F} \times \frac{N}{n},$$

wherein $f_0$ is the updated frequency of the data item, f is an original frequency of the data item, F is a sum of the frequencies of the data items in historical operation behavior data corresponding to all users, N is the total number of the users, n is the total number of users who have the data item, and k is an experience coefficient.

13. The electronic device according to claim 8, wherein the performing safety monitoring on the target operation behavior according to the position of the target point comprises:

determining whether the target point is within a preset safe area, and determining that the target operation behavior is a safe operation behavior under the condition that the target point is within a preset safe area;

or, calculating a safe confidence level of the target operation behavior based on a distance between the target point and an original point in the multi-dimensional coordinate system, wherein the safe confidence level is negatively correlated with the distance between the target point and the original point in the multi-dimensional coordinate system.

14. The electronic device according to claim 8, wherein the dimensions comprise a work directory, an operation instruction and a login identification.

15. A non-transitory computer-readable storage medium, storing a computer program which, when executed by a processor, implements the operations comprising:

acquiring target historical operation behavior data of a target user, and performing data statistics on the target historical operation behavior data according to different dimensions to establish a multi-dimensional coordinate system, wherein coordinate axes in the multi-dimensional coordinate system are in one-to-one correspondence with the dimensions;

determining, in response to receiving a target operation behavior, a target data item corresponding to the target operation behavior in each of the dimensions, and determining whether a marking point corresponding to the target data item exists in the multi-dimensional coordinate system;

increasing a density of the marking point by one under the condition that the marking point corresponding to the target data item exists in the multi-dimensional coordinate system;

under the condition that the marking point corresponding to the target data item does not exist in the multi-dimensional coordinate system, determining the marking point corresponding to the target data item in the multi-dimensional coordinate system, and setting the density of the marking point to be one, wherein a coordinate value of the marking point corresponding to the target data item is less than 1 under the condition that the target data item exists in the target historical operation behavior data, and the coordinate value of the marking point corresponding to the target data item is greater than 1 under the condition that the target data item does not exist in the target historical operation behavior data; and calculating a center of gravity corresponding to each of the coordinate axes according to the density of all the marking points on each of the coordinate axes, and determining a target point based on all the centers of gravity to perform safety monitoring on the target operation behavior according to the position of the target point.

16. The non-transitory computer-readable storage medium according to claim 15, wherein the performing data statistics on the target historical operation behavior data according to different dimensions to establish a multi-dimensional coordinate system comprises:

performing the data statistics on the target historical operation behavior data according to different dimensions to obtain all data items contained in each of the dimensions and a frequency of each of the data items, and normalizing the frequency to obtain a standard frequency of each of the data items; and establishing a multi-dimensional coordinate system, and marking each of the data items on a coordinate axis corresponding to the dimension to which each of the data items belongs based on the standard frequency of each of the data items, wherein the coordinate axes in the multi-dimensional coordinate system are in one-to-one correspondence with the dimensions, $A=1-f_A$, A is the coordinate value of a marking position of the data item, and $f_A$ is the standard frequency of the data item.

17. The non-transitory computer-readable storage medium according to claim 16, wherein after the marking each of the data items on a coordinate axis corresponding to the dimension to which each of the data items belongs based on the standard frequency of each of the data items, the operations further comprise:

determining a total number of data items corresponding to each of the coordinate axes, and calculating a unit distance p of each of the coordinate axes, wherein p=1/S, and S is the total number of the data items;

the determining a marking point corresponding to the target data item in the multi-dimensional coordinate system comprises:

determining $B=1-f_B$ under the condition that the target data item exists in the target historical operation behavior data, wherein B is the coordinate value of the marking point of the target data item, and $f_B$ is the standard frequency of the target data item in the target historical operation behavior data; and determining B=1+bp under the condition that the target data item does not exist in the target historical operation behavior data, wherein b is a positive integer and b is negatively correlated with the frequency of the target data item in the target operation behavior.

18. The non-transitory computer-readable storage medium according to claim 16, wherein before the normalizing the frequency to obtain a standard frequency of each of the data items, the operations further comprise:
- acquiring historical operation behavior data of all users, and determining duplicate data items in the historical operation behavior data of different users;
- denoising the duplicate data items in the target historical operation behavior data according to principle that a higher frequency of the duplicate data items corresponds to a lower weight, to update the frequency of the data items;
- the normalizing the frequency to obtain a standard frequency of each of the data items comprises:
- normalizing an updated frequency to obtain the standard frequency of each of the data items.

19. The non-transitory computer-readable storage medium according to claim 18, wherein a frequency updating formula of the data item is:

$$f_0 = k \times \frac{f^2}{F} \times \frac{N}{n},$$

wherein $f_0$ is the updated frequency of the data item, f is an original frequency of the data item, F is a sum of the frequencies of the data items in historical operation behavior data corresponding to all users, N is the total number of the users, n is the total number of users who have the data item, and k is an experience coefficient.

20. The non-transitory computer-readable storage medium according to claim 15, wherein the performing safety monitoring on the target operation behavior according to the position of the target point comprises:
- determining whether the target point is within a preset safe area, and determining that the target operation behavior is a safe operation behavior under the condition that the target point is within a preset safe area;
- or, calculating a safe confidence level of the target operation behavior based on a distance between the target point and an original point in the multi-dimensional coordinate system, wherein the safe confidence level is negatively correlated with the distance between the target point and the original point in the multi-dimensional coordinate system.

* * * * *